United States Patent [19]

Hacker et al.

[11] Patent Number: 5,973,095
[45] Date of Patent: Oct. 26, 1999

[54] SYNTHESIS OF HYDROGENSILSESQUIOXANE AND ORGANOHYDRIDOSILOXANE RESINS

[75] Inventors: Nigel P. Hacker, San Martin; Todd Krajewski, San Jose; Scott Lefferts, Sunnyvale, all of Calif.

[73] Assignee: AlliedSignal, Inc., Morristown, N.J.

[21] Appl. No.: 09/055,516

[22] Filed: Apr. 6, 1998

Related U.S. Application Data

[60] Provisional application No. 60/044,479, Apr. 21, 1997.
[51] Int. Cl.[6] ................................................. C08G 77/08
[52] U.S. Cl. .............................. 528/12; 528/10; 528/14; 528/23
[58] Field of Search ................................. 528/10, 14, 23, 528/12

[56] References Cited

U.S. PATENT DOCUMENTS 3,615,272  10/1971  Collins et al. ........................... 423/325
5,010,159   4/1991  Bank et al. ............................... 528/23
5,670,596   9/1997  Razzano et al. .......................... 528/16

OTHER PUBLICATIONS

Encyclopedia of Chemical Technology, 4th Edition, John Wiley & Sons, Inc., 1995, vol. 14, p. 777.

Primary Examiner—Melvyn I. Marquis
Assistant Examiner—Mark W. Milstead

[57] ABSTRACT

Novel processes for preparing hydridosiloxane and organohydridosiloxane resins are disclosed. The processes of the invention broadly provide for the steps of contacting a silane monomer with a solid state catalyst in the presence of a reaction mixture that includes a nonpolar, e.g., hydrocarbon, solvent, and a polar solvent, e.g., alcohol and water. The process is conducted under conditions effective to catalytically convert said silane monomer into hydridosiloxanes and organohydridosiloxanes. Recovery of the products is advantageously aided by the ease of separating the solid state catalyst from the reaction mixture. Hydridosiloxanes and organohydridosiloxanes resins produced by the processes of the invention are also provided.

20 Claims, No Drawings

SYNTHESIS OF HYDROGENSILSESQUIOXANE AND ORGANOHYDRIDOSILOXANE RESINS

CROSS REFERENCE TO RELATED APPLICATIONS

This application claims the benefit of the following United States patent applications: U.S. provisional application serial No. 60/044,479, filed Apr. 21, 1997; U.S. nonprovisional application serial No. 09/044,831, filed on Mar. 20, 1998, and U.S. nonprovisional application serial No. 09/044,798, filed Mar. 20, 1998, the disclosures of which are incorporated by reference herein in their entireties.

BACKGROUND OF THE INVENTION

1. Field of the Invention

The present invention relates to the preparation of substrates used in the manufacture of integrated circuits. In particular, the invention provides new and improved methods for preparing siloxane resins, including hydridosiloxanes and organohydridosiloxanes, that are free of the many disadvantages that previously attended the preparation of such materials. More particularly, the invention pertains to synthetic methods that employ a solid state catalyst that avoids the disadvantages of previously employed catalytic systems that required hazardous catalytic reagents. The invention also pertains to synthetic methods that avoid the need for additional washing and purification steps that have heretofore been believed to be required to produce such resins.

2. Description of the Prior Art

It is known in the art that siloxane based resins are useful in the electronic and semiconductor fields to coat silicon chips and other similar components. Such coatings protect the surface of substrates and form dielectric layers between electric conductors on integrated circuits. Such coatings can be used as protective coatings, interlevel dielectric layers, doped dielectric layers to produce transistor like devices, pigment loaded binder systems containing silicon to produce capacitor and capacitor like devices, multilayer devices, 3-D devices, silicon on insulator devices, coatings for superconductors, superlattice devices and the like. These resins include hydridosiloxanes and organohydridosiloxanes containing a significant portion of organic moieties.

The production of siloxane resins, such as silsesquioxane resins, is well known in the art. For example, U.S. Pat. No. 5,486,564 describes the production of polyhydrogensilsesquioxane resins for electronic coatings. However, the process employs dangerous fuming sulfuric acid/sulfuric acid as a catalyst to produce polyhydrogensilsesquioxane. The product was contaminated with significant levels of trace metals despite washing in multiple steps with water containing decreasing percentages of sulfuric acid, followed by removal of all traces of water by azeotropic distillation. In an attempt to remedy these shortcomings, U.S. Pat. No. 5,416,190 describes fractionation of the silsesquioxane product using polar and nonpolar solvents. Other attempts to remedy these deficiencies in the production of silsesquioxane compounds employed supercritical fluid extraction in the purification process, as described by U.S. Pat. No. 5,063,267 and employed fuming/concentrated sulfuric acid but with $CaCO_3$ neutralization, as described by U.S. Pat. No. 5,010,159.

It is also known that the dielectric constant of such insulating films is an important factor where integrated circuits or IC's with low power consumption, cross-talk, and signal delay are required. As IC dimensions continue to shrink, this factor increases in importance. As a result, siloxane based resin materials, and methods for making such materials, that can provide insulating films with dielectric constants below 3.0 are very desirable. In addition, it would be desirable to have siloxane-based resins, and method for making the resins, that provide such low dielectric constant films and which additionally have a high resistance to cracking. It would also be desirable for such films to have low stress when formed in thickness of approximately 1.0 micron ($\mu$m) or greater. Additionally, it would be desirable for such siloxane-based resins, and methods for making, to provide low dielectric constant films via standard processing techniques. In this manner curing processes that require an ammonia or ammonia derivative type of atmosphere (See, U.S. Pat. No. 5,145,723, Sep. 8, 1992, Ballance et al.), an ozone atmosphere (See, U.S. Pat. No. 5,336,532, Haluska et al.), or other non-standard type of semiconductor process, are avoided.

Thus, it would be desirable to produce useful siloxane coating compositions, such as hydridosiloxane and organohydridosiloxane resins, by methods which are both efficient and which do not employ toxic catalytic reagents. It has now surprisingly been found that a reaction employing solid state polymeric catalysts will produce the desired hydridosiloxane and organohydridosiloxane resins while avoiding all of the above described shortcomings of previous methods.

SUMMARY OF THE INVENTION

The processes of the invention provide for production of siloxane resins such as, for example, hydridosiloxanes and hydrogensilsesquioxanes as well as hydrogensiloxanes, organohydrogensilsesquioxanes and organohydrogensiloxanes, in high yield, by catalyzing the hydrolysis and conjugation of a monomer precursor having the general formula of $R^1SiX_3$. In this formula, X is a halogen or $OR^2$, and $R^1$ and $R^2$ are independently H or an alkyl or aryl functional group. When $R^1$ and/or $R^2$ is not H, either or both is independently a substituted or unsubstituted, straight or branched alkyl group, cycloalkyl group and/or aryl group, or a combination thereof Thus, one or more solid state catalysts are employed in the hydrolysis and condensation of the above-described starting compounds, or monomeric precursors, to form desired siloxane resins.

The processes of the invention therefore include the steps of contacting a silane monomer with a solid state catalyst in the presence of a reaction mixture comprising a nonpolar, e.g., a hydrocarbon solvent, a polar solvent, e.g., alcohol and water, under conditions effective to catalytically convert said silane monomer into hydridosiloxanes and organohydridosiloxanes; and thereafter recovering the produced hydridosiloxanes and organohydridosiloxanes.

The processes of the invention are preferably conducted employing a dual phase solvent system. Further, the process is preferably conducted while protected from atmospheric oxygen, e.g., the reaction is conducted in a container that has been purged of oxygen and that is maintained in a flow of an inert gas, e.g., nitrogen gas ($N_2$). In particular, the process is conducted by adding one or more monomer precursors, as described above, such as, trichlorosilane and/or one or more organotrichlorosilanes, or other art-known silane monomers, to a mixture that includes, in one embodiment, a solid state catalyst, a hydrocarbon solvent, and alcohol and water. Once the reaction is complete, the reaction mixture is e.g., filtered, settled or centrifuged, to remove any filterable impurities or precipitants and to remove the solid state catalyst. The water is then separated, and the remaining solution is dried and evaporated to leave the product, typically a white solid. Thereafter, the recovered solid may optionally be slurried in a suitable hydrocarbon solvent to remove residual low molecular weight components, and then the solvent evaporated to leave desired product. The resulting product can be formulated in a suitable solvent for use as a spin-on polymer by methods well known to the art.

The weight average molecular weight ("Mw") of the produced polymer can range from about 400 to about 300,000 atomic mass units ("amu"). In another embodiment, the Mw of the produced polymer can range from about 10,000 to about 80,000 amu, depending on the reaction conditions. In a more particular embodiment, the Mw of the produced polymer can range from about 4,500 to about 75,000 amu. Simply by way of example and with no limitation intended, it has been confirmed that materials produced by the methods of the invention having, e.g., Mw's of about 20,000, about 40,000 and about 60,000 amu have good coating properties.

Thus, the invention provides methods for producing useful siloxanes, such as hydridosiloxanes and organohydridosiloxanes, using suitable starting materials and solvents. In particular, it has surprisingly been discovered that the processes of the invention are efficiently catalyzed by a solid state catalyst. Catalysts according to the invention include, e.g., ion exchange resins, acidic or basic macroreticular resins, clays, including, e.g., acidic clays and the like.

DETAILED DESCRIPTION OF THE PREFERRED EMBODIMENT

Accordingly, the invention provides for novel and unexpected processes for preparing useful compounds, e.g., resins, as described above. In addition, while the invention is described with reference to various embodiments, it should be understood that these embodiments are presented as examples and not limitations of this invention. Thus, various modifications or adaptations of the specific materials and methods may become apparent to those skilled in the art. All such modifications, adaptations or variations that rely upon the teachings of the present invention as illustrated by the embodiments herein, are considered to be within the spirit and scope of the present invention.

Precursors

Any precursor conforming to the general formula given above may be employed in the process of the invention. Thus, the precursor is generally $R^1SiX_3$, wherein X is a halogen or $OR^2$, and $R^1$ and $R^2$ are independently H or an alkyl or aryl functional group and when $R^1$ and/or $R^2$ is not H, either or both is independently a substituted or unsubstituted, straight or branched alkyl group, cycloalkyl group and/or aryl group, or a combination thereof. Thus, in one embodiment X is a halogen, and preferably is chlorine. More preferably, the three X moieties are the same, e.g., $HSiCl_3$. In another preferred embodiment, $R^1$ is as described above and X is $OR^2$, wherein $R^2$ is an alkyl and/or aryl substituent chosen to provide the desired reaction product. Simply by way of example, $R^2$ alkyl substituents are $C_1$ through $C_{20}$, or more, in size, and may be straight chain, branched or cyclic in form. Aryl substituents can, in turn, include straight or branched alkyl, aryl and heteroaryl substituents that are preferably $C_5$ through $C_{20}$, or greater, in size, and are themselves, in turn, optionally alkyl and/or aryl substituted. In a preferred embodiment, all $R^2$'s are the same and, in a preferred embodiment, are all $C_2H_5$ —. In other optional embodiments, X is $X_1$, $X_2$ and $X_3$ and each of $X_1$, $X_2$ and $X_3$ are independently selected from a halogen and/or $OR^2$, wherein $R^2$ is defined as above. Examples of silane precursors useful according to the invention include, but are not limited to, trichlorosilane, methyltrichlorosilane, ethyltrichlorosilane, propyltrichlorosilane, n-butyltrichlorosilane, cyclohexyltrichlorosilane, phenyltrichlorosilane, and combinations thereof, to name but a few. Of course, the artisan will appreciate that any other art-known silane monomers and/or derivatives may be employed as precursors in the processes of the invention and that, optionally, the precursors may be employed singly or in combination, depending on the desired end product.

Solvents

Any suitable solvent systems may be used in the processes of the invention. Preferably, the processes of the invention employ a dual phase solvent system that includes a continuous phase non-polar solvent and a polar solvent.

Non-Polar Solvents

Non-polar solvents employed in the processes of the invention include, but are not limited to, any suitable aliphatic or aromatic compounds or a mixture of any or all such suitable compounds, the operational definition of "suitable" in the present context includes the functional characteristics of:

1) solubilizing the precursor, e.g., monomeric trihalosilane compounds,
2) solubilizing the polymeric products as they are formed and increase in molecular weight during the reaction process,
3) stabilizing the polymeric products in the solvent, and
4) rendering unwanted reaction products insoluble in the non-polar solvent for ease of removal.

Exemplary non-polar solvents include, but are not limited to, pentane, hexane, heptane, cyclohexane, benzene, toluene, xylene, halogenated solvents such as carbon tetrachloride and mixtures thereof Polar Solvents The polar phase of the solvent is substantially immiscible with the non-polar solvent phase, and includes any suitable art-known polar solvents, including, but not limited to, water, alcohols, and water alcohol mixtures. The amount of alcohol present is preferably sufficient to ensure solubility of the reactive intermediates. In particular, exemplary alcohols and other polar solvents suitable for use in the polar phase include, but are not limited to, water, methanol, ethanol, isopropanol, glycerol, diethyl ether, tetrahydrofuran, diglyme and mixtures thereof. In one embodiment, the polar solvent includes a water/alcohol mixture wherein the water is present in an amount sufficient to preferentially solubilize ionic impurities not soluble in alcohol, and/or preclude solvent extraction of product compounds that might otherwise be soluble in alcohol. The polar solvent phase advantageously retains the hydrochloric acid (HCl) condensation product and any metal salt or other ionic contaminants, that may be present. As essentially all ionic contaminants are retained in the polar solvent phase, the hydridosiloxane and/or organohydridosiloxane product of this invention is of high purity and contains essentially no ionic contaminants.

It has been found that a polar solvent to non-polar solvent ratio of between about 5 percent weight to weight (% w/w) to 80% w/w is desirable and between about 9% w/w to about 40% w/w is preferred Processes In order to protect the reaction mixture from exposure to atmospheric oxygen, the reaction is preferably conducted while isolated from the atmosphere by a suitable enclosure and/or a protective flow of a sufficient quantity of any nonreactive, i.e., chemically inert gas, e.g., helium, argon and nitrogen gas. For the instant processes, nitrogen gas is generally preferred as the most cost effective. Further, the reaction vessel is preferably purged of atmospheric contaminants, i.e., oxygen, by a flow of inert gas, prior to commencing the reaction process. More preferably, e.g., when the reaction takes place in an open-top vessel, a blanket of flowing inert gas is maintained over the reaction mixture during the reaction process.

In conducting the reaction process of the invention, a silane precursor, e.g., in certain embodiments a trichlorosilane, alone or in combination with one or more different silane precursors, is added to a mixture of catalyst, non-polar solvent, and polar solvent to form a reaction mixture. The polymerization reaction is allowed to proceed, preferably with mixing. Upon completion of the polymerization reaction, the reaction mixture is filtered, the polar solvent is separated, and the solution is dried and then evaporated to leave a white solid. This solid is then optionally slurried in a hydrocarbon solvent to remove residual low molecular weight material, and finally evaporated to leave the desired product. The so-produced siloxane polymers are suitable for any art-known use, such as formulation in a suitable solvent for use as a spin-on-dielectric film.

Optionally, the processes of the invention are conducted under acidic conditions e.g., by the addition, for example, of HCl to the reaction mixture, as illustrated by the Examples provided below.

The processes of the invention may be conducted at any appropriate temperature, ranging, simply by way of example, from about 10° C. to about 40° C. For example, the reaction may be conducted in an externally heated or cooled reaction vessel, such as, e.g., a water-jacketed reaction vessel. The artisan will appreciate that reaction temperatures will vary depending on the levels of exothermic energy release (when present) of any particular desired reaction process. Thus, the reaction vessel is optionally cooled or heated to achieve an optimal range of reaction temperature, as determined by the time-course and yield—as evidenced by routine testing of a particular desired process. Preferably, the inventive processes are conducted at room temperature, which is generally considered to be about 25° C.

Reaction Times

The processes of the invention are optionally conducted for a wide range of time durations. Essentially, the longer that the reaction mixture is stirred, the higher will be the Mw of the product produced by that reaction, when all other parameters are constant. Simply by way of example, the reaction processes of the invention are conducted for a time ranging from about 1–4 minutes to about 12 hours, or more.

Catalysts

It has unexpectedly been found that the processes of the invention are catalyzed by solid state catalysts, which are generally, but not exclusively in the form of, e.g., ion exchange resins. Thus, preferred catalysts according to the invention, include, for example, strongly acid macroreticular resins (e.g., Amberlyst-15; bead sizes range from 0.3–1.2 mm), weakly acidic macroreticular resins (e.g., Amberlite IRP-64 and/or Amberlite CG-50; bead sizes range from 100–200 mesh size), strongly acidic gel-type resins (e.g., Nafion NR50), strongly basic macroreticular resins (Amberlyst-27; bead size of 0.48 mm), acidic clay (e.g., Montmorillonite KSF), weakly basic ion exchange resins (e.g., Amberlite CG420, Amberlite I-6766 and/or Amberjet 4200(Cl) (Amberjet bead sizes range from 4200–625 microns), to mention just a few of the possible catalysts that may be employed. The catalysts may be employed singly or in combination, e.g., optionally, two or more different catalysts may be utilized, simultaneously or sequentially, during the reaction process. Preferably, the weakly basic ion exchange resins are employed as solid state catalysts according to the invention. Of the weakly basic ion exchange resins Amberjet 4200 (Rohm and Haas), is the most preferred.

Thus, preferred catalysts according to the invention, include, for example, strongly acid macroreticular resins (e.g., Amberlyst-15), weakly acidic macroreticular resins (e.g., Amberlite IRP-64 and/or Amberlite CG-50), strongly acidic gel-type resins (e.g., Nafion NR50), strongly basic macroreticular resins (Amberlyst-27), acidic clay (e.g., Montmorillonite KSF), weakly basic ion exchange resins (e.g., Amberlite CG-420, Amberlite I-6766 and/or Amberjet 4200(Cl), to mention just a few of the possible catalysts that may be employed. The catalysts may be employed singly or in combination, e.g., optionally, two or more different catalysts may be utilized, simultaneously or sequentially, during the reaction process. Preferably, the weakly basic ion exchange resins are employed as solid state catalysts according to the invention. Of the weakly basic ion exchange resins Amberjet 4200 (Rohm and Haas), is the most preferred.

The catalysts of the invention also include clays capable of holding reactants and catalytic substances in sufficient proximity to promote the desired reaction, e.g., the exemplified acidic clay.

The solid state catalysts of the invention also have the advantage that they are readily and inexpensively removed from the reaction mixture, by e.g., settling, centrifugation and/or filtration, thus avoiding the elaborate washing procedures heretofore required for, e.g., previously employed sulfuric acid based catalysts. Thus, the size and shape of the solid state catalyst materials is not believed to be critical, provided that sufficient catalytic activity is available to facilitate the reaction process and the particle and/or bead size is suitable for ready physical separation from the reaction mixture. Nevertheless, simply by way of example, the bead sizes of the ion exchange catalysts range from about 300 to 5000 microns, or more. In particular, the bead sizes will range from about 600 to about 4200 microns, in size. The ion exchange catalyst bead sizes will also range from about 0.4 to about 2 mm, in size and, in particular, from about 0.3 to about 0.1.2 mm. The ion exchange bead sizes may also range from about 25 to about 300 mesh, or greater, and more particularly, from about 100 to about 200 mesh.

The artisan will appreciate that the aforementioned materials and equivalents are readily prepared by art-known methods and are also readily available from commercial sources, for instance, the Amberlite, Amberlyst and Amberjet resins are available from Rohm & Haas (Philadelphia, Pennsylvania), and the Nafion resins as well as Montmorillonite KSF are available from Aldrich (Milwaukee, Wis.). The artisan will also appreciate that, given present disclosure, the suitability of similar catalytic materials for conducting the processes of the invention may be readily determined, by routine screening, by assaying for reaction product(s) in the presence of catalyst and starting materials, under conditions appropriate for producing the desired product(s).

The artisan will appreciate that the quantity of catalyst employed will depend upon, e.g., the particular reaction to be catalyzed, the particular catalyst selected, the particle size, where appropriate, of the solid catalyst, and the desired product molecular weight range and yield of that desired product. Generally, and simply by way of example, the solid catalysts are added to the reaction in amounts ranging from about 0.20 g to about 2.0 grams of catalyst per ml of silane precursor. More particularly, the solid catalysts are added to the reaction in amounts ranging from about 0.30 to about 1.0 g per ml of silane precursor. Alternatively, the solid catalysts are added to the reaction in amounts ranging from about 50 to about 100 g per mol of silane precursor. More particularly, the solid catalysts are added to the reaction in amounts ranging from about 70 to about 90 grams per mole of silane precursor.

Polymers Produced by the Processes of the Invention

Polymers usefully produced by the processes of the invention include, simply by way of example and without limitation, hydridosiloxane and organohydridosiloxane resins such as, for example, hydridosilsesquioxane, hydridomethylsiloxane, hydridoethylsiloxane, hydridopropylsiloxane, hydridobutylsiloxane, hydridotert-butylsiloxane, hydridophenylsiloxane, hydridomethylsilsesquioxane, hydridoethylsilsesquioxane, hydridopropylsilsesquioxane, hydridobutylsilsesquioxane, hydridotert-butylsilsesquioxane and hydridophenylsilsesquioxane, to name but a few.

Thus, the hydridosiloxane resins produced by the processes of the present invention can have, e.g., one of the following six general formulas:

$$(H_{0.4-1.0}SiO_{1.5-1.8})_p \qquad \text{Formula 1}$$

$$(HSiO_{1.5})_n(SiO_2)_w \qquad \text{Formula 2}$$

$$(HSiO_{1.5})_n(R^1SiO_{1.5})_m \qquad \text{Formula 3}$$

$$(H_{0.4-1.0}SiO_{1.5-1.8})_n(R^1_{0.4-1.0}SiO_{1.5-1.8})_m \qquad \text{Formula 4}$$

$$(H_{0-1.0}SiO_{1.5-2.0})_n(R^1SiO_{1.5})_m \qquad \text{Formula 5}$$

wherein:
p is an integer ranging in value from about 8 to about 5000;
the sum of n and w is an integer ranging in value from about 8 to about 5000;
the sum of n and m is from about 8 to about 5000, and m is selected such that the organic substituent is present from about 1 to about 99 Mole percent (Mol %), or greater. In another embodiment, m is selected such that the organic substituent is present from about 4 to about 40 Mole percent (Mol %). In yet another embodiment, m is selected such that the organic substituent is present from about 4 to about 20 Mole percent (Mol %).

$$(HSiO_{1.5})_x(R^1SiO_{1.5})_y(SiO_2)_z \qquad \text{Formula 6}$$

wherein:
the sum of x, y and z is from about 8 to about 5000 and y is selected such that the organic substituent is present up is selected such that the organic substituent is present from about 1 to about 99 Mole percent (Mol %), or greater. In another embodiment, y is selected such that the organic substituent is present from about 4 to about 40 Mole percent (Mol %). In yet another embodiment, y is selected such that the organic substituent is present from about 4 to about 20 Mole percent (Mol %).

In a further embodiment, $R^1$ is selected from substituted and unsubstituted organic groups including normal and branched alkyl groups, cycloalkyl groups, aryl groups, and mixtures thereof; and the specific Mol % of organic or carbon containing substituents is a function of the ratio of the amounts of starting materials.

In some embodiments of the inventive processes, the product will have substituted and unsubstituted normal and branched alkyl groups having between about 1 and 20 carbons; the product will have substituted and unsubstituted cycloalkyl groups having between about 4 and 10 carbons and the product will have substituted and unsubstituted aryl groups have between about 6 and 20 carbons.

For example, where $R^1$ is an alkyl group, $R^1$ includes, but is not limited to, methyl, chloromethyl and ethyl groups, and the normal and branched propyl, 2-chloropropyl, butyl, pentyl and hexyl groups. Where $R^1$ is a cycloalkyl group, $R^1$ includes but is not limited to cyclopentyl, cyclohexyl, chlorocyclohexyl and cycloheptyl groups; where R is an aryl group, R includes but is not limited to phenyl, naphthyl, tolyl and benzyl groups. It will be understood, that the specific carbon content of any specific organohydridosiloxane resin, in accordance with this invention, is a function of the mole ratio of organotrihalosilane(s) to hydridotrihalosilane starting materials employed.

Advantageously, product produced by processes in accordance with the present invention are polymers having a caged structure with a polymer backbone encompassing alternate silicon and oxygen atoms. In particular, each backbone silicon atom is bonded to at least three backbone oxygen atoms to form the aforementioned cage structure. Essentially all additional silicon bonds are only to hydrogen and the organic substituents, when present. defined in Formulae 1, 2, 3, 4, 5 and 6. Thus, polymers of the present invention have essentially no hydroxyl or alkoxy groups bonded to backbone silicon atoms and cross-linking reactions are suppressed.

In contrast, previously known organosiloxane resins had high levels of alkoxy groups bonded to backbone silicon atoms, thus significant hydrolysis to form silanol groups was observed. This hydrolysis resulted in higher dielectric constants for the as-cured polymer films formed from those previously known resins, as well as reduced shelf life of solutions of these resins. The latter effect was reported to be caused by unwanted chain lengthening and cross-linking.

Thus, the processes of the invention, by providing only hydrogen and organic groups directly bonded to backbone silicon atoms, advantageously avoids unwanted chain lengthening and cross-linking caused by condensation of the hydroxyl or silanol groups. Consequently, in an additional benefit, the shelf life of solutions of organohydridosiloxane resins produced by the processes of the invention is significantly prolonged over similar resin solutions produced by previously employed processes.

Yields

The polymer component is generally produced by the inventive processes in an amount ranging from about 20% to about 90% Mol. percent of the staring materials. In particular, product is preduced at a yield ranging from about 35 to about 75% Mol. percent of the starting materials.

Polymer Applications

The following characteristics encompass non-limiting measurements that illustrate the properties of the above-described organohydridosiloxane polymer resins produced by the novel processes of the present invention. The methods of measurement used are as follows:

1) Film Thickness (A): Film thickness is measured using a calibrated Nanospec® AFT-Y CTS-102 model 010-180 Film Thickness Measurement System available from Nanometrics, Co. An average of measurements at five locations on a wafer are reported as the film thickness for each sample.

2) Molecular Weight ("MW"): Molecular weight is determined reference to polystyrene standards using a gel phase chromatography ("GPC") system from Waters Corporation, Milford, Mass., equipped with a Waters 510 pump, Waters 410 differential refractometer and a Waters 717 autosampler. The procedure used is as set forth by S. Rosen in "Fundamental Principles of Polymeric Materials, pages 53–81, (2nd Ed. 1993) and incorporated herein by reference herein.

EXAMPLES

The following non-limiting examples serve to illustrate the invention.

Example 1

Preparation of Hydridosiloxane by Catalysis of $HSiCl_3$ With Amberlyst-15

50.59 g Amberlyst-15(wet) strongly acidic, macroreticular resin, 25 ml 38% HCl, and 50 ml denatured Ethanol were placed in a 2 L Morton flask. The flask was purged with $N_2$ and 425 ml Hexanes was added. An $N_2$ blanket was established and maintained on the vessel for the remainder of the reaction. A mixture of 150 ml Hexane/50 ml $HSiCl_3$ was added at a rate of 1.00 ml/min. with a peristaltic pump, while the solution was stirred. After the addition the reaction mix was allowed to stir overnight. The solution was then allowed to settle and the solids separated from the liquid phases by vacuum filtration through a #1 Whatman filter. The two liquid phases were then placed in a separatory funnel and the bottom layer discarded. The top layer was then placed in a flask and 25 g $K_2CO_3$ and 25 g $CaCl_2$ were added to form a mixture. The mixture was stirred overnight and then vacuum filtered through a #1 Whatman filter to remove the solids. The remaining solution was then evaporated to dryness on a rotary evaporator. 7.3 g white, highly viscous material remained. The weight average molecular weight ("Mw") measured 7729, and the number average molecular weight average ("Mn") was 889, and the ratio of Mw/Mn was 8.6943 as determined by GPC.

Example 2

Preparation of Hydridosiloxane by Catalysis of $(C_2H_5O)_3SiH$ With Amberlyst-15

52.65 g Amberlyst-15(wet) strongly acidic, macroreticular resin, 25 ml 38% HCl, and 50 ml denatured Ethanol were placed in a 2 L Morton flask. The flask was purged with $N_2$ and 425 ml Hexane's was added. An $N_2$ blanket was established and maintained on the vessel for the remainder of the reaction. A mixture of 150 ml Hexane/80 ml $(C_2H_5O)_3SiH$ was added at a rate of 1.00 ml/min. with a peristaltic pump, while the solution was stirred. After the addition the reaction mix was allowed to stir overnight. The solution was then allowed to settle and the solids separated from the liquid phases by vacuum filtration through a #1 Whatman filter. The two liquid phases were then place in a separatory funnel and the bottom layer discarded. The top layer was then placed in a flask, 25 g $K_2CO_3$ and 25 g $CaCl_2$ were added. The mixture was stirred overnight and then vacuum filtered through a #1 Whatman filter to remove the solids. The solution was evaporated to dryness on a rotary evaporator. 5.86 g of a white, dry material remained. Mw measured 243649, Mn 8175, and Mw/Mn 28.7031 by GPC.

Example 3

Preparation of Hydridosiloxane by Catalysis of $HSiCl_3$ With Amberlite IRP-64/Amberlyst A-26

18.24 g Amberlite IRP-64 weakly acidic, macroreticular resin, 20 ml denatured Ethanol and 10 ml 38% HCl were placed in a 500 ml Morton flask. The flask was purged with $N_2$ and 250 ml Hexanes was added. An $N_2$ blanket was established and maintained on the vessel for the remainder of the reaction. 22 ml $HSiCl_3$ was added to the reaction vessel at a rate of 0.60 ml/min. with a peristaltic pump, while the solution was stirred. After the addition was complete, the reaction mix was allowed to stir for 4 hours. The agitator was then shut off and the reaction mixture allowed to settle overnight. The solids separated from the liquid phases by vacuum filtration through a #4 Whatman filter. The two liquid phases were then placed in a separatory funnel and the bottom layer discarded. The top layer was then placed in a flask, 10.67 g Amberlyst A-26 strongly basic ion exchange resin and 19.34 g silica gel were added. The mixture was stirred for 1.5 hours and then vacuum filtered to remove the solids. The solution was evaporated to dryness on a rotary evaporator. 3.1 g of white solid material remained. Mw measured 21527, Mn 1540, Mw/Mn 13.9755 by GPC.

Example 4

Preparation of Hydridosiloxane by Catalysis of $HSiCl_3$ With Nafion NR50 Strongly Acidic, Gel Type Resin 250 ml Hexanes, 20 ml denatured Ethanol and 9.7 g Nafion NR50 strongly acidic, gel type resin were placed in a 500 ml Morton flask. The flask was purged with $N_2$ and an $N_2$ blanket was established and maintained on the vessel for the remainder of the reaction. 6.3 ml deionized $H_2O$ was added to the flask. 18 ml $HSiCl_3$ was added to the reaction vessel at a rate of 1.20 ml/min. with a peristaltic pump, while the solution was stirred. After the addition was complete, the reaction mix was allowed to stir for 4 min. The agitator was then shut off and the solids separated from the liquid phases by vacuum filtration through a #4 Whatman filter. The two liquid phases were then place in a separatory funnel and the bottom layer discarded. The top layer was then placed in a flask and 60 g of 4 angstrom molecular sieve was added. The mixture was allowed to sit for 3 hours with occasional stirring and then vacuum filtered through a #1 Whatman filter to remove the solids. The solution was evaporated to dryness on a rotary evaporator. 3.73 g white, solid material remained. Mw measured 7053, Mn 2118, Mw/Mn 3.3296 by GPC.

Example 5

Preparation of Hydridosiloxane by Catalysis of $HSiCl_3$ With Amberlyst-27

The Amberlyst-27 strongly basic, macroreticular resin was prepared by washing with two bed volumes deionized $H_2O$ followed by two bed volumes absolute methanol. It was then blown dry with $N_2$ overnight and evaporated at 30° C. to complete the drying. 250 ml Hexanes and 18.27 g Amberlyst-27 were placed in a 500 ml Morton flask and allowed to stir for 5 min. The flask was purged with $N_2$ and an $N_2$ blanket was established and maintained on the vessel for the remainder of the reaction. 20 ml denatured ethanol and 6.3 ml deionized $H_2O$ were then added to the flask. 18 ml $HSiCl_3$ was added to the reaction vessel at a rate of 1.20 ml/min. with a peristaltic pump, while the solution was stirred. After the addition was complete, the reaction mix was allowed to stir for 80 min. The agitator was then shut off and the solids separated from the liquid phases by vacuum filtration through a #4 Whatman filter. The two liquid phases were then place in a separatory funnel and the bottom layer discarded. The top layer was then placed in a flask and 65 g of 4 angstrom molecular sieve was added. The mixture was allowed to sit for 2 hours with occasional stirring and then vacuum filtered through a #3 Whatman filter to remove the solids. The solution was evaporated to dryness on a rotary evaporator. 1.85 g white, solid solid material remained. Mw measured 4670, Mn 1310, Mw/Mn 3.5637 by GPC.

Example 6

Preparation of Hydridosiloxane by Catalysis of $HSiCl_3$ With Amberlyst-31

250 ml Hexanes and 18.13 g Amberlyst-31 strongly acidic, gel type resin were placed in a 500 ml Morton flask and allowed to stir for 5 min. The flask was purged with $N_2$ and an $N_2$ blanket was established and maintained on the vessel for the remainder of the reaction. 20 ml denatured ethanol and 6.3 ml deionized $H_2O$ were then added to the flask. 18 ml $HSiCl_3$ was added to the reaction vessel at a rate of 0.85 ml/min. with a peristaltic pump, while the solution was stirred. After the addition was complete, the reaction mix was allowed to stir for 60 min. The agitator was then shut off and the solids separated from the liquid phases by vacuum filtration through a #4 Whatman filter. The two liquid phases were then placed in a separatory funnel and the bottom layer discarded. The top layer was then placed in a flask and 61 g of 4 angstrom molecular sieve was added. The mixture was allowed to sit for 2 hours with occasional stirring and then vacuum filtered through a #2 Whatman filter to remove the solids. The solution was evaporated to dryness on a rotary evaporator. 6.17 g white, solid material remained. Mw measured 17062, Mn 3666, Mw/Mn 4.6548 by GPC.

Example 7

Preparation of Hydridosiloxane by Catalysis of $HSiCl_3$ With Montmorillonite KSF Acidic Clay 250 ml Hexane's and 18.08 g Montmorillonite KSF acidic clay were placed in a 500 ml Morton flask and allowed to stir for 5 min. The flask was purged with $N_2$ and an $N_2$ blanket was established and maintained on the vessel for the remainder of the reaction. 20 ml denatured ethanol and 6.3 ml deionized $H_2O$ were then added to the flask. 18 ml $HSiCl_3$ was added to the reaction vessel at a rate of 0.85 ml/min. with a peristaltic pump, while the solution was stirred. After the addition was complete, the reaction mix was allowed to stir for 45 min. The agitator was then shut off and the solids separated from the liquid phases by vacuum filtration through a #2 Whatman filter. The two liquid phases were then place in a separatory funnel and the bottom layer discarded. The top layer was then placed in a flask and 61 g of 4 angstrom molecular sieve was added. The mixture was allowed to sit overnight and then vacuum filtered through a #2 Whatman filter to remove the solids. The solution was evaporated to dryness on a rotary evaporator. 3.06 g of solid white resin remained. Mw measured 6348, Mn 1929, Mw/Mn 3.2919 by GPC.

Example 8

Preparation of Hydridosiloxane by Catalysis of $HSiCl_3$ With Amberlite CG-420/Amberlyst 15

A 2 L Morton flask was purged overnight with $N_2$. 500 ml of hexanes, 40 ml of denatured ethanol, and 20 ml of 38% hydrochloric acid were combined with 36.1 g of Amberlite CG-420 weakly basic ion exchange resin. 44 ml (0.436 mol.) trichlorosilane was added at a rate of 0.42 ml/min. by peristaltic pump, while solution was stirred. After addition was complete, the reaction mixture was stirred for an additional 3 hr. The solution was allowed to settle, and then was filtered by vacuum through a Whatman #4 filter paper in a Buchner funnel. The filter cake was washed twice with 100 ml hexane. The solution was placed in a separatory funnel and the bottom layer (about 10 ml) was discarded. The remaining solution was placed in a flask with 62 g Amberlyst 15 strongly acidic ion exchange resin and 60 g of silica gel. Solution was stirred for 1 hr then was allowed to sit overnight. Solution was filtered by gravity through a fluted filter paper and Amberlyst/silica gel mixture was washed twice with 100 ml hexanes. Solution was evaporated to dryness on a Buchi rotary evaporator. 10.3 g of white solid was collected. Calculated yield was 44.6%. Mw was measured by GPC as 45,278 AMU, Mn as 6496, and Mw/Mn as 6.97.

Example 9

Preparation of Hydridosiloxane by Catalysis of $HSiCl_3$ With Amberlite CG420/Amberlyst A26

A 2 L Morton flask was purged overnight with $N_2$. 500 ml of hexanes, 41 ml of denatured ethanol, and 20 ml of 38% hydrochloric acid were combined with 36.2 g of Amberlite CG-420 weakly basic ion exchange resin. 44 ml (0.436 mol.) trichlorosilane was added at a rate of 1.3 ml/min. by peristaltic pump while solution was stirred. After the addition was complete, reaction was stirred for an additional 3 hr. Solution was allowed to settle, and then was filtered by vacuum through a Whatman #4 filter paper in a Buchner funnel. The filter cake was washed three times with 100 ml hexane. The solution was placed in a separatory funnel and the bottom layer was discarded. Approximately one third of the solution was placed in a flask with 20.22 g Amberlyst A-26 strongly basic ion exchange resin and stirred for 70 min. The solution was filtered by vacuum through a Whatman #4 filter in a Buchner funnel and the Amberlyst was washed twice with 50 ml hexanes. The solution was evaporated to dryness on a Buchi rotary evaporator. 4.6 g of white powder was collected. Mw was measured by GPC as 75,055 AMU, Mn as 6786, and Mw/Mn as 11.06

Example 10

Preparation of Hydridosiloxane by Catalysis of $HSiCl_3$ With Amberlite CG-420/Amberlyst A26 $CaCl_2$ A 2 L Morton flask was purged overnight with $N_2$. 500 ml of hexanes, 41 ml of denatured ethanol, and 20 ml of 38% hydrochloric acid were combined with 36.2 g of Amberlite CG-420 weakly basic ion exchange resin. 44 ml (0.436 mol.) trichlorosilane was added at a rate of 1.3 ml/min. by peristaltic pump while solution was stirred. After addition was complete, the reaction mix was stirred for an additional 3 hr. The solution was allowed to settle, and then was filtered by vacuum through a Whatman #4 filter paper in a Buchner funnel. The filter cake was washed three times with 100 ml hexane. The solution was placed in a separatory funnel and the bottom layer was discarded. Approximately one third of the solution was placed in a flask with 15.03 g Amberlyst A-26 strongly basic ion exchange resin and 3.51 g of calcium chloride. Solution was stirred for 60 min. The solution was filtered by vacuum through a Whatman #4 filter in a Buchner funnel and Amberlyst/calcium chloride mixture was washed twice with 50 ml hexanes and the solution was evaporated to dryness on a Buchi rotary evaporator. 3.0 g of white solid was collected. Mw was measured by GPC as 51,480, Mn as 6575, and Mw/Mn as 7.83.

Example 11

Preparation of Hydridosiloxane by Catalysis of $HSiCl_3$ With Amberlite I-6766/Amberlyst A26 $CaCl_2$ A 500 ml Morton flask was purged overnight with $N_2$. 250 ml of hexanes, 20 ml of denatured ethanol, and 10 ml of 38% hydrochloric acid were combined in the flask. 18.2 g of Amberlite I-6766 weakly basic ion exchange resin was added and solution was stirred. 22 ml (0.218 mol.) trichlorosilane was added at a rate of 0.5 ml/min. by peristaltic pump. After addition was complete, the reaction mix was stirred for an additional 3 hr. the solution was allowed to settle, and then was filtered by vacuum through a Whatman #4 filter paper in a Buchner funnel. The filter cake was washed twice with 100 ml hexane. Solution was placed in a separatory funnel and the bottom layer (about 1 ml) was discarded. Remaining solution was placed in a flask with 18.3 g Amberlyst A-26 strongly basic ion exchange resin and 18.4 g of calcium chloride. The solution was stirred for 30 min, then an additional 12.2 g Amberlyst and 12.9 g calcium chloride were added. Stirring was continued for 30 min. more. Solution was filtered by vacuum through a Whatman #4 filter in a Buchner funnel and Amberlyst/calcium chloride mixture was washed twice with 50 ml hexanes. Solution was evaporated to dryness on a Buchi rotary evaporator. 6.3 g of white solid was collected. Calculated yield was 54.5%. Mw was measured by GPC as 33,446 AMU, Mn as 4005, and Mw/Mn as 8.35.

Example 12

Preparation of Hydridosiloxane by Catalysis of $HSiCl_3$ With Amberlite CG420/Amberlyst A26 $CaCl_2$ A 500 ml Morton flask was purged overnight with $N_2$. 250 ml of hexanes, 20 ml of denatured ethanol, and 6.3 ml of deionized water were combined in the flask. 18.2 g of Amberlite CG420 weakly basic ion exchange resin was added and solution was stirred. 22 ml (0.218 mol.) HSiCl3 was added at a rate of 0.6 ml/min. by peristaltic pump. After addition was complete, reaction was stirred for an additional 3 hr. The solution was allowed to settle, and then was filtered by vacuum through a Whatman #4 filter paper in a Buchner funnel. The filter cake was washed twice with 100 ml hexane. Solution was placed in a separatory funnel, but no layer separation was observed. The solution was placed in a flask with 30.1 g Amberlyst A-26 strongly basic ion exchange resin and 28.9 g of calcium chloride and stirred for 1 hr. The solution was filtered by vacuum through a Whatman #4 filter in a Buchner funnel and Amberlyst/calcium chloride mixture was washed twice with 100 ml hexanes the solution was evaporated to dryness on a rotary evaporator. 7.4 g of white solid was collected. Calculated yield was 64.0%. Mw was measured by GPC as 36,356, Mn as 4709, and Mw/Mn as 7.72.

Example 13

Preparation of Hydridosiloxane by Catalysis of $HSiCl_3$ With Amberlite CG-50

A 500 ml Morton flask was purged overnight with $N_2$. 250 ml of hexanes, 20 ml of denatured ethanol, and 6.3 ml of deionized water were combined in the flask. 18.05 g of Amberlite CG-50 weakly acidic ion exchange resin was added and solution was stirred. 22 ml (0.218 mol.) of trichlorosilane was added at a rate of 0.5 ml/min. by peristaltic pump. After addition was complete, reaction was stirred for an additional 45 min. Solution was allowed to settle, and then was filtered by vacuum through a Whatman #4 filter paper in a Buchner funnel. The filter cake was washed twice with 100 ml hexane. Solution was placed in a separatory funnel, and bottom layer was discarded. Solution was placed in a flask with 15.37 g silica gel and was stirred for 30 min. Solution was filtered by vacuum through a Whatman #4 filter in a Buchner funnel and silica gel was washed twice with 50 ml hexanes. Solution was evaporated to dryness on a Buchi rotary evaporator. 4.6 g of white solid was collected. Calculated yield was 39.8%. Mw was measured by GPC as 11,192, Mn as 1930, and Mw/Mn as 5.71.

Example 14

Preparation of Hydridosiloxane by Catalysis of $HSiCl_3$ With Amberlite I-6766/Amberlite I-6766

A 500 ml Morton flask was purged overnight with $N_2$. 15.02 g of Amberlite I-6766 weakly basic ion exchange resin, 250 ml of hexanes, 20 ml of denatured ethanol, and 6.3 ml of deionized water were combined in the flask, and solution was stirred. 22 ml (0.218 mol.) trichlorosilane was added at a rate of 0.6 ml/min. by peristaltic pump. After addition was complete, reaction was stirred for an additional 95 min. Solution was allowed to settle, and then was filtered by vacuum through a Whatman #4 filter paper in a Buchner funnel. The filter cake was washed twice with 100 ml hexane. Solution was placed in a separatory funnel, and bottom layer was discarded. Solution was placed in a flask with 20.33 g Drierite and was stirred for 10 min. 3.03 g of Amberlite I-6766 was added and stirring was continued for another 15 min. Solution was filtered by vacuum through a Whatman #1 filter in a Buchner funnel and filter cake was washed twice with 50 ml hexanes. Solution was evaporated to dryness on a Buchi rotary evaporator. 6.94 g of white solid was collected. Calculated yield was 60.1%. Mw was measured by GPC as 28,929, Mn as 4150, and Mw/Mn as 6.97.

Example 15

Film Forming Properties of Product of Example 1

0.9949 g of product from Example 1 was dissolved in 3.0077 g cumene. The solution was spun on a wafer at 3000 RPM for 20 seconds, then was baked at 150° C., 200° C., then 250° C. for one min. each. Material formed a 7100 Angstrom film.

Example 16

Film Forming Properties of Product of Example 5

1.0088 g of product from Example 5 was dissolved in 1.3357 g heptane and 4.0198 g cumene. The solution was spun on a wafer at 3000 RPM for 20 seconds, then was baked at 150° C., 200° C., then 300° C. for one min. each. Material formed a 2400 Angstrom film.

Example 17

Wafer Coating Properties of Product of Example 7

0.8850 g of product from Example 7 was dissolved in 0.5903 g of MgSO4 dried heptane, 2.2257 g of MgSO4 dried cumene, and 0.4038 g heavy mineral oil. The solution was spun on a wafer at 3000 RPM for 20 seconds, then was baked at 150° C., 200° C., then 300° C. for one min. each. Wafer was then cured at 400° C. for 1 hr. with 4 L/min. $N_2$. Material formed a 5500 Angstrom film.

Example 18

Preparation of 25 Mole Percent Methylhydridosiloxane

A 250 ml Morton flask was fitted with a condenser and a stirrer connected to an arrow 1750 motor. The flask was purged with $N_2$ and during the reaction $N_2$ was blown across the top of the condenser into an NaOH scrubber. 15 g of Amberlite I-6766 ion exchange resin catalyst, 20 ml of ethanol, 6.3 ml of water, and 250 ml of hexanes were added to the flask, and stirring was started. 13 ml (0.129 mol.) of trichlorosilane and 5 ml (0.043 mol.) of methyltrichlorosilane (24.9 mol % methyltrichlorosilane) were combined together in an HDPE bottle. This mixture of silanes was added to the Morton flask through a peristaltic pump at a rate of 0.6 ml/min. After addition was completed, stirring was continued for 90 min. Solution was filtered by vacuum through a Whatman #4 filter in a buchner funnel. Solution was added to a separatory funnel and the lower, aqueous layer was discarded. The upper layer was dried over 40 g of 3 Å molecular sieves for 2.5 hr. Solution was filtered by vacuum through a Whatman #1 filter paper in a buchner funnel. Solution was evaporated on a Buchi rotary evaporator at 60° C. 5.2 g of white solid was collected. Calculated yield was 53.5%. Mw was measured by GPC as 12,300 AMU with a polydispersity of 4.35.

Example 19

Preparation of 20 Mole Percent Methylhydridosiloxane

A 2 L Morton flask was fitted with a dry-ice condenser and a stirrer connected to an arrow 1750 motor. The reactor was placed in a water bath set at 25° C. The flask was purged with $N_2$ and during the reaction $N_2$ was blown across the top of the condenser into an NaOH scrubber. 60.25 g of Amberjet 4200(Cl) ion exchange resin catalyst, 80 ml of ethanol, 25 ml of water, and 1000 ml of hexanes were added to the flask, and stirring was started. 58 ml (0.575 mol.) of trichlorosilane and 17 ml (0.145 mol.) of methyltrichlorosilane (20.1 mol % methyltrichlorosilane) were combined together in an FEP bottle. This mixture of silanes was added to the Morton flask by peristaltic pump through a ¼" Teflon tube at a set rate of 8.0 RPM. Calculated addition rate was 2.5 ml/min. After addition was completed, stirring was continued for 185 min. Solution was filtered by vacuum through a Whatman #4 filter in a buchner funnel. Solution was added to a separatory funnel and the lower, aqueous layer was discarded. The upper layer was dried over 171 g of 4 Å molecular sieves for 3.5 hr. Solution was filtered by vacuum through a Whatman #2 filter paper in a buchner funnel. Solution was evaporated on a Buchi rotary evaporator at 60° C. Yield was 25.2 g of white solid. Calculated yield was 62.7%. Mw was measured by GPC as 26,014 AMU with a polydispersity of 13.68.

Example 20

Preparation of 4 Mole Percent Methylhydridosiloxane

A 2 L Morton flask was fitted with a dry-ice condenser and a stirrer connected to an arrow 1750 motor. The reactor was placed in a water bath set at 25° C. The flask was purged with $N_2$ and during the reaction $N_2$ was blown across the top of the condenser into an NaOH scrubber. 60.40 g of Amberjet 4200(Cl) ion exchange resin catalyst, 80 ml of ethanol, 25 ml of water, and 1000 ml of hexanes were added to the flask, and stirring was started. 70 ml (0.694 mol.) of trichlorosilane and 3.5 ml (0.030 mol.) of methyltrichlorosilane (4.1 mol % methyltrichlorosilane) were combined together in an FEP bottle. This mixture of silanes was added to the Morton flask by peristaltic pump through a ¼" Teflon tube at a set rate of 10.0 RPM. Calculated addition rate was 2.45 ml/min. After addition was completed, stirring was continued for 60 min. Solution was filtered by vacuum through a Whatman #4 filter in a buchner funnel. Solution was added to a separatory funnel and the lower, aqueous layer was discarded. The upper layer was dried over 171.53 g of 4 Å molecular sieves for 3 hr. Solution was filtered by vacuum through a Whatman #1 filter paper in a buchner funnel. Solution was evaporated on a Buchi rotary evaporator at 60° C. Yield was 25.1 g of white solid. Calculated yield was 64.7%. Mw was measured by GPC as 22,094 AMU with a polydispersity of 8.77.

Example 21

Preparation of 20 Mole Percent Ethylhydridosiloxane

A 1 L jacketed reactor was fitted with a dry-ice condenser, a stirrer connected to an arrow 850 motor, and a glass dip tube. The reactor was connected to a recirculating water bath set at 25° C. The flask was purged with $N_2$ and during the reaction $N_2$ was blown across the top of the condenser into an NaOH scrubber. 60.6 g of Amberjet 4200(Cl) ion exchange resin catalyst, 80 ml of ethanol, 25 ml of water, and 1000 ml of hexanes were added to the reactor, and stirring was started. 58 ml (0.575 mol.) of trichlorosilane and 19 ml (0.145 mol.) of ethyltrichlorosilane (20.1 mol % ethyltrichlorosilane) were combined together in an FEP bottle. This mixture of silanes was added to the reactor by peristaltic pump through a ¼" Teflon tube at a set rate of 11.2 RPM. Calculated addition rate was 2.2 ml/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 171 g of 4 Å molecular sieves for 3 hr. Solution was filtered by vacuum through a Teflon membrane with 1 micron pores set on a glass frit. Solution was evaporated on a Buchi rotary evaporator at 60° C. Yield was 31.0 g of white solid. Calculated yield was 73.5%. Mw was measured by GPC as 23,987 AMU with a polydispersity of 10.27.

Example 22

Preparation of 20 Mole Percent Propylhydridosiloxane

A 2 L jacketed reactor was fitted with a dry-ice condenser, a stirrer connected to an arrow 6000 motor, and a glass dip tube. The reactor was connected to a recirculating water bath set at 25° C. The flask was purged with $N_2$ and during the reaction $N_2$ was blown across the top of the condenser into an NaOH scrubber. 59.5 g of Amberjet 4200(Cl) ion exchange resin catalyst, 80 ml of ethanol, 25 ml of water, and 1000 ml of hexanes were added to the reactor, and stirring was started. 58 ml (0.575 mol.) of trichlorosilane and 21.5 ml (0.145 mol.) of propyltrichlorosilane (20.1 mol % propyltrichlorosilane) were combined together in an FEP bottle. This mixture of silanes was added to the reactor by peristaltic pump through a ¼" Teflon tube at a set rate of 11.0 RPM. Calculated addition rate was 2.3 ml/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 170.5 g of 4 Å molecular sieves for 3.5 hr. Solution was filtered by vacuum through a Teflon membrane with 1 micron pores set on a glass frit. Solution was evaporated on a Buchi rotary evaporator at 60° C. Yield was 35.8 g of white solid. Calculated yield was 81.0%. Mw was measured by GPC as 17,840 AMU with a polydispersity of 7.49.

Example 23

Preparation of 20 Mole Percent n-Butylhydridosiloxane

A 1 L jacketed reactor was fitted with a dry-ice condenser, a stirrer connected to an arrow 6000 motor, and a glass dip tube. The reactor was connected to a recirculating water bath set at 25° C. The flask was purged with $N_2$ and during the reaction $N_2$ was blown across the top of the condenser into an NaOH scrubber. 59.9 g of Amberjet 4200(Cl) ion exchange resin catalyst, 80 ml of ethanol, 25 ml of water, and 1000 ml of hexanes were added to the reactor, and stirring was started. 58 ml (0.575 mol.) of trichlorosilane and 24 ml (0.145 mol.) of n-butyltrichlorosilane (20.2 mol % n-butyltrichlorosilane) were combined together in an FEP bottle. This mixture of silanes was added to the reactor by peristaltic pump through a ¼" Teflon tube at a set rate of 7.0 RPM. Calculated addition rate was 2.3 ml/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 171.6 g of 4 Å molecular sieves for 3 hr. Solution was filtered by vacuum through a Teflon membrane with 1 micron pores set on a glass frit. Solution was evaporated on a Buchi rotary evaporator at 60° C. Yield was 38.1 g of clear, viscous liquid. Calculated yield was 82.4% Mw was measured by GPC as 16,022 AMU with a polydispersity of 6.45.

Example 24

Preparation of 20 Mole Percent Cyclohexylhydridosiloxane

A 2 L jacketed reactor was fitted with a dry-ice condenser, a stirrer connected to an arrow 6000 motor, and a glass dip tube. The reactor was connected to a recirculating water bath set at 25° C. The flask was purged with $N_2$ and during the reaction $N_2$ was blown across the top of the condenser into an NaOH scrubber. 60.2 g of Amberjet 4200(Cl) ion exchange resin catalyst, 80 ml of ethanol, 25 ml of water, and 1000 ml of hexanes were added to the reactor, and stirring was started. 59 ml (0.585 mol.) of trichlorosilane and 26 ml (0.147 mol.) of cyclohexyltrichlorosilane (20.1 mol % cyclohexyltrichlorosilane) were combined together in an FEP bottle. This mixture of silanes was added to the reactor by peristaltic pump through a ¼" Teflon tube at a set rate of 11.0 RPM. Calculated addition rate was 2.7 ml/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 172.1 g of 4 Å molecular sieves for 5 hr. Solution was filtered by vacuum through a Teflon membrane with 1 micron pores set on a glass frit. Solution was evaporated on a Buchi rotary evaporator at 60 C. Yield was 42.33 g of white solid. Calculated yield was 83.3% Mw was measured by GPC as 12,721 AMU with a polydispersity of 7.18.

Example 25

Preparation of 20 Mole Percent Phenylhydridosiloxane

A 1 L jacketed reactor was fitted with a dry-ice condenser, a stirrer connected to an arrow 6000 motor, and a glass dip tube. The reactor was connected to a recirculating water bath set at 25° C. The flask was purged with $N_2$ and during the reaction $N_2$ was blown across the top of the condenser into an NaOH scrubber. 60.2 g of Amberjet 4200(Cl) ion exchange resin catalyst, 80 ml of ethanol, 25 ml of water, and 1000 ml of hexanes were added to the reactor, and stirring was started. 58 ml (0.575 mol.) of trichlorosilane and 23 ml (0.144 mol.) of phenyltrichlorosilane (20 mol % phenyltrichlorosilane) were combined together in an FEP bottle. This mixture of silanes was added to the reactor by peristaltic pump through a ¼" Teflon tube at a set rate of 7.0 PM. Calculated addition rate was 2.03 ml/min. After addition was completed, stirring was continued for 120 min. Solution was filtered by vacuum twice through Whatman #4 filters in buchner funnels. Solution was added to a separatory funnel and the lower, aqueous layer was discarded. The upper layer was dried over 171.3 g of 4 Å molecular sieves overnight. Solution was filtered by vacuum through a Teflon membrane with 20 micron pores set on a glass frit. Solution was then further filtered by vacuum through a Teflon membrane with 5 micron pores set on a glass frit. Solution was evaporated on a Buchi rotary evaporator at 60° C. Yield was 22.2 g of white solid. Calculated yield was 45.3%. Mw was measured by GPC as 77,827 AMU with a polydispersity of 37.92.

Example 26

Preparation of 20 Mole Percent t-Butylhydridosiloxane

A 2 L jacketed reactor was fitted with a dry-ice condenser, a stirrer connected to an arrow 6000 motor, and a glass dip tube. The reactor was connected to a recirculating water bath set at 25° C. The flask was purged with $N_2$ and during the reaction $N_2$ was blown across the top of the condenser into an NaOH scrubber. 60.77 g of Amberjet 4200(Cl) ion exchange resin catalyst, 80 ml of ethanol, 25 ml of water, and 1000 ml of hexanes were added to the reactor, and stirring was started. 58 ml (0.575 mol.) of trichlorosilane and 27.84 g (0.145 mol.) of t-butyltrichlorosilane (20.2 mol % t-butyltrichlorosilane) were combined together in an FEP bottle. This mixture of silanes was added to the reactor by peristaltic pump through a ¼" Teflon tube at a set rate of 12.3 RPM. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 172.1 g of 4 Å molecular sieves for 3 hr. Solution was filtered by vacuum through a Teflon membrane with 1 micron pores set on a glass frit. Solution was evaporated on a Buchi rotary evaporator at 60° C. Yield was 35.35 g of white gel. Calculated yield was 76.5%. Mw was measured by GPC as 11,379 AMU with a polydispersity of 4.51.

Example 27

Results and Discussion

TABLE 1

Results by Example No. and Catalyst

| Example # | Mw | Mn | Poly-dispersity | % Yield | Catalyst |
|---|---|---|---|---|---|
| 1 | 7729 | 889 | 8.6943 | 28% | Amberlyst-15 |
| 2 | 243649 | 8175 | 28.7031 | 26% | Amberlyst-15 |
| 3 | 21527 | 1540 | 13.9755 | 28% | Amberlite-IRP64 |
| 4 | 7053 | 2118 | 3.3296 | 39% | Nafion NR50 |
| 5 | 4670 | 1310 | 3.5637 | 20% | Amberlyst-27 |
| 6 | 17062 | 3666 | 4.6548 | 65% | Amberlyst-31 |
| 7 | 6348 | 1929 | 3.2919 | 32% | KSF (clay) |
| 8 | 45,278 | 6496 | 6.97 | 44.6% | Amberlite CG-420 |
| 9 | 75,055 | 6786 | 11.06 | NA | Amberlite CG-420 |
| 10 | 51,480 | 6575 | 7.83 | NA | Amberlite CG-420 |
| 11 | 33,446 | 4005 | 8.35 | 54.5% | Amberlite I-6766 |
| 12 | 36,356 | 4709 | 7.72 | 64.0% | Amberlite CG-420 |
| 13 | 11,192 | 1930 | 5.71 | 39.8% | Amberlite CG-50 |
| 14 | 28,929 | 4150 | 6.97 | 60.1% | Amberlite I-6766 |
| 18 | 12,300 | 2828 | 4.35 | 53.5% | Amberjet 4200 (Cl) |
| 19 | 26,014 | 1902 | 13.68 | 62.7% | Amberjet 4200 (Cl) |
| 20 | 22,094 | 2519 | 8.77 | 64.7% | Amberjet 4200 (Cl) |
| 21 | 23,987 | 2336 | 10.27 | 73.5% | Amberjet 4200 (Cl) |
| 22 | 17,840 | 2382 | 7.49 | 81.0% | Amberjet 4200 (Cl) |
| 23 | 16,022 | 2484 | 6.45 | 82.4% | Amberjet 4200 (Cl) |
| 24 | 12,721 | 1772 | 7.18 | 83.3% | Amberjet 4200 (Cl) |
| 25 | 77,827 | 2054 | 37.92 | 45.3% | Amberjet 4200 (Cl) |
| 26 | 11,379 | 2523 | 4.51 | 76.5% | Amberjet 4200 (Cl) |

NA indicates data not available

The artisan will appreciate from the data of the Examples, as summarized by Table 1, above, that a wide range of Mw, Mn and polydispersity properties are provided by the solid state catalyts of the invention. In particular, the best results for the purpose of providing resin polymers for coating of electronic wafers are provided by the weakly basic ion exchange resins, such as the exemplified Amberjet 4200.

The data provided by the above examples confirms the unexpected results that a wide range of solid and gel materials catalyze the polymerization of silane precursors to produce, e.g., desirable hydridosiloxane and organohydridosiloxane polymers.

What is claimed is:

1. A process for preparing hydridosiloxane and organohydridosiloxane resins comprising the steps of
a. contacting a silane monomer with a solid state catalyst in the presence of a reaction mixture comprising a hydrocarbon solvent, alcohol and water under conditions effective to catalytically convert said silane monomer into hydridosiloxanes and organohydridosiloxanes; and
b. recovering said produced hydridosiloxanes and organohydridosiloxanes.

2. The process of claim 1 wherein said hydrocarbon solvent, alcohol and water form a dual phase solvent system.

3. The process of claim 1 wherein said silane monomer has the general formula of $R^1SiX_3$, wherein X is a halogen or $OR^2$, and $R^1$ and $R^2$ are independently selected from the group consisting of H, an alkyl and an aryl moiety.

4. The process of claim 3 wherein $R^1$ and $R^2$ are moieties independently selected from the group consisting of H, straight alkyl, branched alkyl, cycloalkyl, aryl and combinations thereof.

5. The process of claim 4 wherein said straight alkyl, branched alkyl, cycloalkyl, and aryl moieties are independently substituted or unsubstituted.

6. The process of claim 1 wherein said catalyst is selected from the group consisting of strongly acidic macroreticular resins, weakly acidic macroreticular resins, strongly acidic gel-type resins, strongly basic macroreticular resins, clay containing a catalytic moiety, weakly basic ion exchange resins and combinations thereof.

7. The process of claim 6 wherein said clay is acidic.

8. The process of claim 1 wherein step b further comprises the step of separating suspended materials from said reaction mixture and said produced hydridosiloxanes and organohydridosiloxanes.

9. The process of claim 8 wherein said suspended materials are separated from said reaction mixture by a method selected from the group consisting of filtration, centrifugation, gravity mediated settling of said suspended materials and combinations thereof.

10. The process of claim 3 wherein said silane monomer is selected from the group consisting of trichlorosilane, methyltrichlorosilane, ethyltrichlorosilane, propyltrichlorosilane, n-butyltrichlorosilane, cyclohexyltrichlorosilane, phenyltrichlorosilane, triethylsilane, and combinations thereof.

11. The process of claim 1 wherein the product produced is described by a formula selected from the group consisting of:

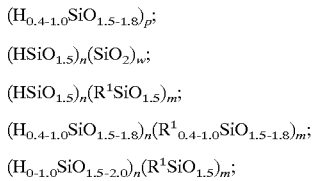

wherein:

p is an integer ranging in value from about 8 to about 5000;
the sum of n and w is an integer ranging in value from about 8 to about 5000;
the sum of n and m is an integer ranging in value from about 8 to about 5000; and
m is selected such that the organic substituent is present at a Mole percent ranging from about 1 to about 99; and wherein
$R^1$ is a moiety selected from the group consisting of straight alkyl, branched alkyl, cycloalkyl and aryl.

12. The process of claim 11 wherein $R^1$ is a moiety selected from the group consisting of methyl, chloromethyl, ethyl, propyl, 2-chloropropyl, butyl, pentyl, hexyl, cyclopentyl, cyclohexyl, chlorocyclohexyl, cycloheptyl, phenyl, napthyl, tolyl, and benzyl.

13. The process of claim 11 wherein $R^1$ is a moiety selected from the group consisting of methyl, chloromethyl, ethyl, propyl, 2-chloropropyl, butyl, pentyl, hexyl, cyclopentyl, cyclohexyl, chlorocyclohexyl, cycloheptyl, phenyl, napthyl, tolyl, and benzyl and alkyl $R^1$ moieties are straight or branched.

14. The process of claim 1 wherein said product is selected from the group consisting of hydridosilsesquioxane, hydridosiloxane, hydridomethylsiloxane, hydridoethylsiloxane, hydridopropylsiloxane, hydridobutylsiloxane, hydridotert-butylsiloxane, hydridophenylsiloxane, hydridomethylsilsesquioxane, hydridoethylsilsesquioxane, hydridopropylsilsesquioxane, hydridobutylsilsesquioxane, hydridotert-butylsilsesquioxane and hydridophenylsilsesquioxane, and combinations thereof.

15. The process of claim 1 wherein said reaction mixture comprises a ratio of the polar solvent to the non-polar solvent ranging from about 5 percent to about 80 percent, calculated as weight to weight.

16. The process of claim 6 wherein said catalyst is a weakly basic ion exchange resin.

17. The process of claim 1 wherein the product is described by the formula:

$$(HSiO_{1.5})_x(R^1SiO_{1.5})_y(SiO_2)_z,$$

wherein:
the sum of x, y, and z is a number ranging from about 8 to about 5000 and y is selected such that the organic substituent is present in a Mole percent ranging from about 1 to about 99 Mole percent; and
wherein $R^1$ is a moiety selected from the group consisting of straight alkyl, branched alkyl, cycloalkyl and aryl and $R^1$ is substituted or unsubstituted.

18. A product produced by the process of claim 1.

19. The product of claim 18 that is selected from the group consisting of hydridosilsesquioxane, hydridosiloxane, hydridomethylsiloxane, hydridoethylsiloxane, hydridopropylsiloxane, hydridobutylsiloxane, hydridotert-butylsiloxane, hydridophenylsiloxane, hydridomethylsilsesquioxane, hydridoethylsilsesquioxane, hydridopropylsilsesquioxane, hydridobutylsilsesquioxane, hydridotert-butylsilsesquioxane and hydridophenylsilsesquioxane, and combinations thereof.

20. The product of claim 18 that is described by a formula selected from the group consisting of:

$$(H_{0.4-1.0}SiO_{1.5-1.8})_p;$$

$$(HSiO_{1.5})_n(SiO_2)_w;$$

$$(HSiO_{1.5})_n(R^1SiO_{1.5})_m;$$

$$(H_{0.4-1.0}SiO_{1.5-1.8})_n(R^1{}_{0.4-1.0}SiO_{1.5-1.8})_m;$$

$$(H_{0-1.0}SiO_{1.5-2.0})_n(R^1SiO_{1.5})_m;$$

wherein:
p is an integer ranging in value from about 8 to about 5000;
the sum of n and w is an integer ranging in value from about 8 to about 5000;
the sum of n and m is an integer ranging in value from about 8 to about 5000; and
m is selected such that the organic substituent is present at a Mole percent ranging from about
1 to about 99; and wherein
$R^1$ is a moiety selected from the group consisting of straight alkyl branched alkyl, cycloalkyl and aryl.

* * * * *